(12) United States Patent
Nelke et al.

(10) Patent No.: US 8,666,998 B2
(45) Date of Patent: Mar. 4, 2014

(54) HANDLING DATA SETS (75) Inventors: Sebastian Nelke, Schoenaich (DE);
Martin A Oberhofer, Bondorf (DE);
Yannick Saillet, Stuttgart (DE); **Jens
Seifert**, Gaertringen (DE)

(73) Assignee: **International Business Machines
Corporation**, Armonk, NY (US)

( * ) Notice: Subject to any disclaimer, the term of this patent is extended or adjusted under 35 U.S.C. 154(b) by 0 days.

(21) Appl. No.: 13/173,383

(22) Filed: Jun. 30, 2011

(65) Prior Publication Data

US 2012/0066214 A1   Mar. 15, 2012

(30) Foreign Application Priority Data

Sep. 14, 2010   (EP) .................................... 10176677

(51) Int. Cl.
*G06F 17/30* (2006.01)

(52) U.S. Cl.
USPC ............ 707/758; 707/749; 707/776; 707/780

(58) Field of Classification Search
USPC .................. 707/687, 690, 758, 749, 776, 780
See application file for complete search history.

(56) References Cited

U.S. PATENT DOCUMENTS

| | | |
|---|---|---|
| 5,315,709 A | 5/1994 | Alston et al. |
| 5,392,390 A | 2/1995 | Crozier |
| 5,555,346 A | 9/1996 | Gross |
| 5,561,793 A | 10/1996 | Bennett et al. |
| 5,586,025 A | 12/1996 | Tsuji |
| 5,684,990 A | 11/1997 | Boothby |
| 5,729,665 A | 3/1998 | Gauthier |
| 5,761,671 A | 6/1998 | Blackman et al. |
| 5,802,253 A | 9/1998 | Gross |
| 5,943,676 A | 8/1999 | Boothby |
| 5,966,717 A | 10/1999 | Sass |
| 6,029,160 A | 2/2000 | Cabrera et al. |

(Continued)

FOREIGN PATENT DOCUMENTS

| | | |
|---|---|---|
| EP | 0513653 A2 | 11/1992 |
| EP | 1798684 A1 | 6/2007 |
| JP | 2007279852 A | 10/2007 |
| WO | 0062191 | 10/2000 |

OTHER PUBLICATIONS

Koch et al., "Policy Definition Language for Automated Management of Distributed Systems", (1996) IEEE 2nd Int'l of Distrib. Sys., pp. 55-64.

(Continued)

*Primary Examiner* — Debbie Le
(74) *Attorney, Agent, or Firm* — Susan Murray; Edell, Shapiro & Finnan, LLC (57) ABSTRACT

A method, system and computer program product provides a first characteristic associated with a first data set and a single data value, and a second characteristic associated with a second data set; and calculates at least one of: 1) the similarity of the first data set with the second data set based on the first and second characteristics, 2) the similarity of the first data set with the single data value based on the first characteristic and the single data value, 3) confidence indicating how well the first characteristic reflects properties of the first data set based on the first characteristic, and 4) confidence indicating how well the similarity of the first data set with the single data value reflects properties of the single data value based on the first characteristic and the single data value.

22 Claims, 7 Drawing Sheets

(56) References Cited

U.S. PATENT DOCUMENTS

| | | | |
|---|---|---|---|
| 6,044,381 A | 3/2000 | Boothby et al. | |
| 6,076,090 A | 6/2000 | Burroughs et al. | |
| 6,154,748 A | 11/2000 | Gupta et al. | |
| 6,230,157 B1 | 5/2001 | Malcolm et al. | |
| 6,279,008 B1 | 8/2001 | Ng et al. | |
| 6,301,584 B1 | 10/2001 | Ranger | |
| 6,408,302 B1 | 6/2002 | Lee et al. | |
| 6,460,048 B1 | 10/2002 | Teng et al. | |
| 6,496,835 B2 | 12/2002 | Liu et al. | |
| 6,609,133 B2 | 8/2003 | Ng et al. | |
| 7,039,898 B2 | 5/2006 | Shah | |
| 7,043,492 B1 | 5/2006 | Neal | |
| 7,069,269 B2 | 6/2006 | Morris | |
| 7,080,088 B1 | 7/2006 | Lau | |
| 7,136,852 B1* | 11/2006 | Sterling et al. | 1/1 |
| 7,437,471 B2 | 10/2008 | Hohmann | |
| 7,472,346 B2 | 12/2008 | Baelen | |
| 7,536,409 B2 | 5/2009 | Barcia | |
| 7,657,506 B2 | 2/2010 | Levin | |
| 7,797,289 B2 | 9/2010 | Chan et al. | |
| 7,814,045 B2 | 10/2010 | Hermann et al. | |
| 7,921,110 B1* | 4/2011 | Ting et al. | 707/736 |
| 7,958,162 B2* | 6/2011 | Basile | 707/804 |
| 8,266,168 B2* | 9/2012 | Bayliss | 707/758 |
| 2001/0014890 A1 | 8/2001 | Liu et al. | |
| 2002/0007482 A1 | 1/2002 | Cime | |
| 2002/0089681 A1 | 7/2002 | Gauthier | |
| 2002/0143761 A1 | 10/2002 | Shimano | |
| 2002/0143818 A1 | 10/2002 | Roberts | |
| 2003/0225742 A1 | 12/2003 | Tenner et al. | |
| 2004/0083199 A1 | 4/2004 | Govindugari et al. | |
| 2005/0050068 A1 | 3/2005 | Vaschillo et al. | |
| 2005/0091640 A1 | 4/2005 | McCollum | |
| 2005/0131771 A1* | 6/2005 | Tischer | 705/26 |
| 2005/0182777 A1 | 8/2005 | Block et al. | |
| 2005/0197931 A1 | 9/2005 | Gupta | |
| 2005/0262113 A1 | 11/2005 | Arora et al. | |
| 2005/0283486 A1 | 12/2005 | Lauterbach et al. | |
| 2006/0026127 A1 | 2/2006 | Bodlaender | |
| 2006/0101423 A1 | 5/2006 | Aharoni et al. | |
| 2006/0230025 A1 | 10/2006 | Baelen | |
| 2006/0242181 A1 | 10/2006 | Mueller-Klingspor | |
| 2007/0112827 A1 | 5/2007 | Dettinger | |
| 2007/0198910 A1 | 8/2007 | Jensen | |
| 2008/0140602 A1 | 6/2008 | Roth et al. | |
| 2008/0177731 A1 | 7/2008 | Matsuzaki | |
| 2008/0201172 A1 | 8/2008 | McNamar | |
| 2008/0208855 A1* | 8/2008 | Lingenfelder et al. | 707/6 |
| 2008/0275829 A1 | 11/2008 | Stull et al. | |
| 2008/0319983 A1* | 12/2008 | Meadows | 707/5 |
| 2009/0006282 A1 | 1/2009 | Roth et al. | |
| 2009/0006283 A1 | 1/2009 | Labrie et al. | |
| 2009/0006472 A1 | 1/2009 | Bush et al. | |
| 2009/0019358 A1 | 1/2009 | Blake | |
| 2009/0024551 A1 | 1/2009 | Agrawal et al. | |
| 2009/0030754 A1 | 1/2009 | McNamar | |
| 2009/0037488 A1 | 2/2009 | Abrams | |
| 2009/0138789 A1 | 5/2009 | Tangen et al. | |
| 2009/0287923 A1* | 11/2009 | Topalov et al. | 713/156 |
| 2010/0131526 A1* | 5/2010 | Sun et al. | 707/758 |
| 2011/0178971 A1 | 7/2011 | Meeks et al. | |
| 2011/0196621 A1* | 8/2011 | Huyse et al. | 702/34 |
| 2011/0225173 A1* | 9/2011 | Gulhane et al. | 707/749 |
| 2012/0095970 A1 | 4/2012 | Shyam et al. | |
| 2012/0096434 A1* | 4/2012 | Rama | 717/120 |
| 2012/0158625 A1 | 6/2012 | Nelke et al. | |
| 2012/0158678 A1 | 6/2012 | McGraw et al. | |
| 2012/0197836 A1 | 8/2012 | Meeks et al. | |
| 2012/0216274 A1* | 8/2012 | Chauhan et al. | 726/13 |
| 2012/0254739 A1 | 10/2012 | Dehmann et al. | |
| 2012/0330911 A1 | 12/2012 | Gruenheid et al. | |
| 2013/0031117 A1 | 1/2013 | Mandelstein et al. | |

OTHER PUBLICATIONS

Computer Associates International et al., Chapters 7-9 "Truth Maintenance", Computer Associates International, Inc., 70 pages, Jan. 1, 2004.

PCT International Search Report and Written Opinion, PCT/EP2011/069332, Jan. 5, 2012, 12 pages.

Wolfgang May, "A Database-Based Service for Handling Logical Variable Bindings", Institut fur Informatik, Universitat Gottingen, Germany, 14 pages, Jan. 1, 2009.

Computer Associates International et al., CleverPath Avion Business Rules Expert, Computer Associates International, Inc., 64 pages, Jan. 1, 2004.

Computer Associates International et al., Chapter 5 "Pattern Matching, Pattern Matching Rules", Computer Associates International, Inc., 36 pages, Jan. 1, 2004.

Computer Associates International et al., Chapter 7 "Truth Maintenance, Truth Maintenance Operations and Terminology", and Chapter 8 Maintaining the Dynamic Rulebase, Computer Associates International, Inc., 12 pages, Jan. 1, 2004.

http://www.xbrl.org/TaxonomyRecognition/US%20GAAP%202009/XBRLUS-USGAAP, "XBRL US Country Taxonomy 2009", pp. 1-2.

http://www.xbrl.org/TaxonomyRecognition/US%20GAAP%202009/XBRLUS-USGAAP, "XBRL US Accountants' Report Taxonomy 2009", pp. 1-2.

http://www.xbrl.org/TaxonomyRecognition/US%20GAAP%202009/XBRLUS-USGAAP, "XBRL US GAAP Taxonomy 2009", pp. 1-2.

http://www.w3.org/TR/owl-parsing/ "OWL Web Ontology Language Parsing OWL in RDF/XML", W3C Working Group Note Jan. 21, 2004, pp. 1-20.

Pauvel Shvaiko et al., "Ontology Matching OM-2009", Papers from the ISWC Workshop, pp. 1-271.

International Search Report and Written Opinion, PCT/EP2011/062074, Sep. 21, 2012, 16 pages.

Mason B. McDaniel, "An Algorithm for Content-Based Automated File Type Recognition, Master Thesis", James Madison University, www.forensicswiki.org/w/images/f/f9/Mcdaniel01.pdf Dec. 1, 2001, 105 pages.

International Search Report and Written Opinion, PCT/IB2012/053380, Nov. 15, 2012, 10 pages.

"Legacy Data Encapsulator", ip.com, Jun. 14, 2001, 3 pages.

* cited by examiner

HANDLING DATA SETS

CROSS REFERENCE TO RELATED APPLICATIONS

This application claims foreign priority under 35 U.S.C. §119(a)-(d) to Application No. EP 10176677 filed on 14 Sep. 2010, entitled "Method and Arrangement for Handling Data Sets, Data Processing Program and Computer Program Product," the entire contents of which are hereby incorporated by reference.

FIELD OF THE INVENTION

The present invention relates in general to the field of data management, and in particular to a method and an arrangement or system for handling data sets. Still more particularly, the present invention relates to a data processing program and a computer program product for handling data sets.

BACKGROUND

A challenge in data integration projects is always the quantity of data sources that need to be understood. Enterprise information technology (IT) applications usually involve the use of several thousands of tables, each of these tables containing up to several hundreds of columns. The meaning and semantic of each of these columns is often not documented and it is a tedious but indispensable task to understand the data before the integration work can begin.

To facilitate this task, data understanding tools, such as IBM® InfoSphere® Information Analyzer have been invented to help the user understand and document the data sources by looking directly at the data contained in these sources. (IBM and InfoSphere are trademarks of International Business Machines Corporation, registered in many jurisdictions worldwide.)

Common features of such tools are to compute general statistics for each analyzed column, such as cardinality of the column, minimum/maximum values, most frequent value, etc., value distributions showing the user what different values are contained in a single column and how frequent the different values are, format analysis showing the user what different formats are used by the values of the columns, for instance a ZIP code being represented in 60% of the cases as a five digits value and in 40% of the cases as a five digits value followed by a four digits value, inferred types showing the user what type is really used by the values of the columns, independently from the data type of the column as defined in the metadata of the database, for instance a character based column may contain only numeric values coded as strings, and basic data classification, like for example the column contains free text, numbers or codes.

Advanced data profiling tools, such as the above mentioned Information Analyzer product additionally allow the use of specialized algorithms to detect specific domains from the data of a column. For instance, by using regular expressions or a dictionary of values, such algorithms may be able to detect that a column contains a ZIP code, a US address, a person name, an email address, a phone number, etc.

This ability to classify columns based on the values they contain is important since it documents a cryptic physical source with semantic information and facilitates its mapping to a business term or a logical model, which is well understood by the user. However in the state of the art, the algorithms used to classify the data are specific to the domain. For classical domains, such as US addresses, person names, etc. specialized algorithms are delivered out of the box. However for domains which are specific to a company like product references, enterprise codes, ticket reports, etc. or are not common like a postal code in Belgium, for example, new algorithms have to be written for the particular domain and plugged in the tool. Since the development of such algorithms requires special knowledge, the users usually have to classify a large part of their data manually, by looking at the data and using expert knowledge to recognize the domain. This is a time consuming operation, since the data of each individual column must be evaluated manually, even if the semantic of the column is used by different columns.

BRIEF SUMMARY

Accordingly, in embodiments of the present invention a method, system and computer program product are provided for handling data sets, which comprise Providing a first characteristic associated with a first data set and at least one of the following: A single data value and a second characteristic associated with a second data set; the provided characteristics allowing feasible comparison of the first data set, the second data set and the single data value, and calculating at least one of the following: Similarity of the first data set with the second data set based on the first and second characteristics, similarity of the first data set with the single data value based on the first characteristic and the single data value, confidence indicating how well the first characteristic reflects properties of the first data set based on the first characteristic, and confidence indicating how well the similarity of the first data set with the single data value reflects properties of the single data value based on the first characteristic and the single data value.

BRIEF DESCRIPTION OF THE SEVERAL VIEWS OF THE DRAWINGS

A preferred embodiment of the present invention, as described in detail below, is shown in the drawings, in which.

DETAILED DESCRIPTION

Embodiments of the present invention provide methods, systems, and computer program products which facilitate the classification of data in any domain without requiring the use of specialized algorithms. Further, embodiments of the present invention facilitate the automatic detection of values which are incompatible to the domain of the corresponding data set in a way which is domain independent.

Therefore embodiments of the present invention evaluate the quality of the data to integrate in a data integration project. When data have been entered by a human, for example from an input mask filled by an operator in a call center, it quite often happens, that data values entered in a specific column don't correspond to the domain of the column. A common example is when an email address is entered by the operator in a field that should contain a phone number, because the phone number is not available but the application requires a value for this field. Another example is when people enter a random combination of characters or simply a "-" in a mandatory field because they don't know what to fill or don't have the correct value, etc. To evaluate the quality of the data and correct those data values before they get loaded into a new target system, it is important to understand what common types of invalid values each column may contain and detect those invalid values.

In the state of the art this problem is used by using data profiling tools such as the above mentioned Information Analyzer, which computes for each column value distributions and format distributions and allow the user to define what a valid/invalid value/format is. The tool only supports the user by displaying and describing the data. The user has to decide manually which values are valid and which values are invalid for the given column. After that, the tool is able to find all rows where the value of the specified column doesn't fulfill the criteria defined by the user. This approach is very time consuming as it requires the user to review each column and define one or multiple validity criteria for the column's values. Besides that, it is very difficult for this mechanism to handle certain types of columns. It is for instance easy but time consuming to define for a column containing a limited set of categorical values, for example a column gender may only have two different values: "M", and "F", by specifying explicitly what the valid values are or not. It is also feasible but time consuming to define for a column containing values following a specific format, such as ZIP codes, SSN numbers, phone numbers, email addresses, a regular expression that will validate whether each value belongs to the domain of the column or not. It is on the other side difficult and rather impossible to define such rules for a column containing non structured or non standardized data, such as person names, company names, or any type of data containing unique values and non repeatable formats.

A core idea of the present invention is to compute automatically for each data set characteristics so called "fingerprints" characterizing the class of data contained in the corresponding data set, e.g. a column. Such a fingerprint is made up of several metrics capturing different aspects of the data. Each metric composing the fingerprint is computed using a corresponding metric algorithm. Details on suggested metrics are explained later in this disclosure, but examples of metrics can be a metric measuring the frequency of each character or combination of characters in all the data values of the data set, a metric measuring the most frequent terms or formats in the data values of the data set, a metric measuring diverse statistics like average length, percentage of letters or digits, etc. for the data values of the data set etc. Also new metric algorithms can be added to the system because the "fingerprint concept" is not dependent on specific metric algorithms. Each metric algorithm used should provide methods allowing the quick computation of a similarity score between a data set and a metric algorithm of same type belonging to another data set to decide, if these two data sets contain similar data values, and a similarity score between a data set and a single data value to decide, if this data value could belong to this data set.

Some of the metric algorithms may be more or less relevant depending on the type of data in the data set. For example, a metric algorithm capturing the most frequent formats is not very representative for a data set containing data with a very high number of formats, for example an address field, but is on the other side very relevant for a data set containing values having a constant format, for instance a ZIP code. For this reason, each metric algorithm should provide methods to compute the confidence of the metric algorithm for the data set it belongs to. So metric algorithms used by embodiments of the present invention allow quick computation of a similarity score between two fingerprints belonging to two different data sets or between a fingerprint and one single data value.

When comparing two fingerprints of two data sets, a low score indicates no domain matching between the two data sets. So the two data sets contain data that look different. A score close to 100% indicates a domain matching between the two data sets. So the two data sets are likely to contain data of same type, because the data presents similar characteristics.

When comparing a fingerprint with a single data value, a low score indicates that the value doesn't match well in the domain of the data set. A value close to 100% indicates that the value is consistent with the domain of the values of the data set owning the fingerprint. To compare a single data value with the fingerprint of a data set the metric algorithms used to determine the fingerprint of the data set are also used to determine a corresponding fingerprint of the single data value.

When analyzing the data sets, there is a time expensive effort to compute the fingerprint of each data set. Once computed, this fingerprint can be serialized and attached to the metadata of the analyzed data set and easily retrieved. The operation to compare two fingerprints with each other or one fingerprint with a data value are in comparison cheap, so that a large number of pairs of columns can be compared with each others in a short time.

Once fingerprints have been computed for each data set, what is done during the data analysis operation, and stored in a metadata repository, a data profiling tool like the above mentioned Information Analyzer can use these fingerprints to provide a semi automatic way of classifying data.

Like in the prior art, the user would have first to look at a few data values of the data set and set the data class for this data set manually, but each time the data class of a data set is defined, embodiments of the present invention can use the precomputed fingerprints to find all the other data sets that have similar fingerprints like the reviewed data set. Based on that, embodiments of the present invention can set automatically the data class of all non reviewed data sets whose similarity exceeds a defined threshold, or it can use this information to suggest a data class to the user, when the user wants to define the domain of a new data set, based on the similarity with a data set whose domain is already known.

This semi automatic process accelerates a lot the reviewing work of the user. Even if the user starts with a system where no data set has a defined domain, the user doesn't have to deeply inspect the values of each individual data set. Instead the user only needs to do that for a few data values of a few data sets. Embodiments of the present invention find then the similarities with the non reviewed data sets. In a data migration process, for example in the context of a consolidation of several legacy systems into a new system, where the data of an unknown system have to be moved to a known system, the data class of the data sets of the target systems are all known. In that case the process of guessing the domain of each source data set wouldn't require the user to analyze manually a small core of data values first, because the target system contains enough examples.

The fingerprints also allow automatic detection of data values which do not fit in the domain of a corresponding data set. All single data values of a data set can be compared to the data set's fingerprint. The fingerprint produces then for each single data value a score which can be used to sort the data values. The data values with the lowest scores are data values which might not fit in the domain of the data set and require a manual review.

Such fingerprints can also be used to solve other problems, such as detect mapping candidates in a data transformation.

The above, as well as additional purposes, features, and advantages of the present invention will become apparent in the following detailed written description.

Figure 1:
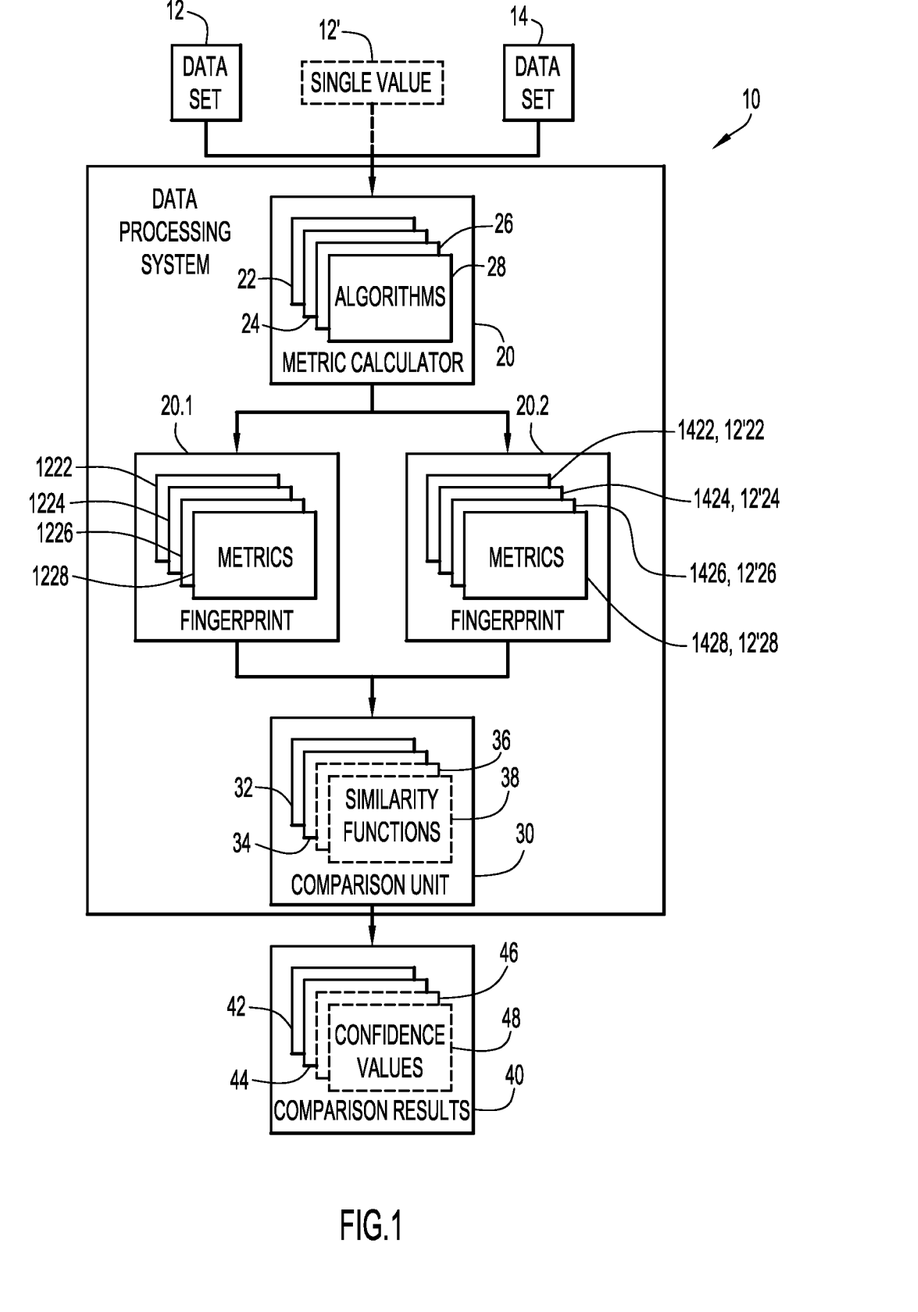
FIG. 1 is a schematic block diagram of a data processing system, in accordance with an embodiment of the present invention.
Figure 2:
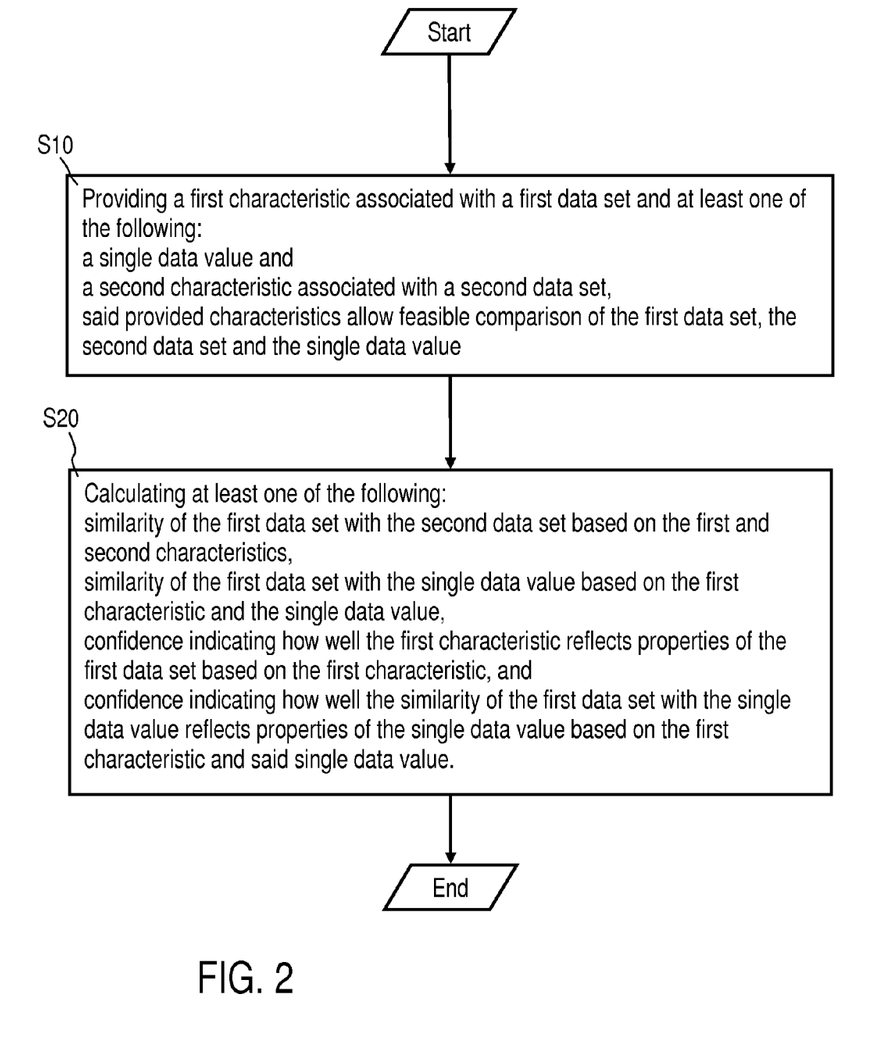
FIG. 2 is a schematic flow diagram of a method for handling data sets, in accordance with an embodiment of the present invention.

FIG. 1 shows a data processing system 10, in accordance with an embodiment of the present invention, and FIG. 2 shows a method for handling data sets 12, 14 in accordance with an embodiment of the present invention.

Referring to FIGS. 1 and 2, the shown embodiment of the present invention employs a method for handling data sets 12, 14 comprising providing a first characteristic 20.1 or so called "fingerprint" associated with a first data set 12 and at least one of the following: A single data value and a second characteristic 20.2 associated with a second data set 14 in step S10, wherein the provided characteristics 20.1, 20.2 allow feasible comparison of the first data set 12, the second data set 14 and the single data value 12'. To compare the single data value 12' with the first data set 12, a characteristic 20.1 is usually also determined for the single data value 12'. This characteristic for the single data value can be precalculated, or it can be calculated when the comparison of the first data set with the single data value takes place. In step S20, at least one of the following is calculated: Similarity of the first data set 12 with the second data set 14 based on the first and second characteristics 20.1, 20.2, similarity of the first data set 12 with the single data value 12' based on the first characteristic 20.1 and the single data value 12', confidence indicating how well the first characteristic 20.1 reflects properties of the first data set 12 based on the first characteristic 20.1, and confidence indicating how well the similarity of the first data set 12 with the single data value 12' reflects properties of the single data value based on the first characteristic 20.1 and the single data value 12'. In FIG. 1, components representing the single data value 12' or being applied to the single data value 12' are depicted in dashed lines. The first data set may be compared to the second data set and to the single data value based on the similarity values, to assess whether the first data set and the second data set or the single value are in the same data domain.

Still referring to FIG. 1, in the shown embodiment the data processing system 10 uses four metric algorithms 22, 24, 26, 28 in block 20 to calculate metric values 1222, 1224, 1226, 1228 being part of a first characteristic 20.1 of the first data set 12, and to calculate metric values 1422, 1424, 1426, 1428 being part of a second characteristic 20.2 of the second data set 14 to be compared with the first data set 12. Alternatively, more or less than the four metric algorithms 22, 24, 26, 28 may be used to calculate the metric values 1422, 1424, 1426, 1428 of the second characteristic 20.2. As further alternative, block 20 receives at least one of the following from external sources and provides them for further processing: The first characteristic 20.1 of the first data set 12 and the second characteristic 20.2 of the second data set 14. So the characteristics 20.1, 20.2 of the data sets 12, 14 could be determined during preprocessing.

If the first data set 12 is to be compared with the single data value 12' in Block 20 instead of metric values 1422, 1424, 1426, 1428 of the second data set 14 corresponding metric values 12'22, 12'24, 12'26, 12'28 of the single data value 12' will be calculated by the metric algorithms 22, 24, 26, 28 used to calculate the first characteristic 20.1 of the first data set 12. This is generally done in connection with comparison and not during preprocessing. The metric algorithms 22, 24, 26, 28 provide in addition to corresponding metric values 1222, 1224, 1226, 1228, 12'22, 12'24, 12'26, 12'28, 1422, 1424, 1426, 1428 at least one similarity value 42, 44 and at least one confidence value 44, 48 based on the metric values 1222, 1224, 1226, 1228, 12'22, 12'24, 12'26, 12'28, 1422, 1424, 1426, 1428. Each metric algorithm 22, 24, 26, 28 uses a first similarity function 32 of a comparison unit 30 to calculate a first similarity value 42 based on the metric values 1222, 1224, 1226, 1228 of the first data set 12 and the metric values 1422, 1424, 1426, 1428 of a same metric algorithm 22, 24, 26, 28 applied to the second data set 14, and a first confidence function 34 of the comparison unit 30 to calculate a first confidence value 44 indicating how well the corresponding metric algorithm 22, 24, 26, 28 reflects properties of the first data set 12 based on the metric values 1222, 1224, 1226, 1228 of the first data set 12.

Further, each metric algorithm uses a second similarity function 36, shown in dashed lines, of the comparison unit 30 to calculate a second similarity value 46 based on the metric values 1222, 1224, 1226, 1228 of the first data set 12 and the metric values 12'22, 12'24, 12'26, 12'28 of the same metric algorithms 22, 24, 26, 28 applied to the single data value 12', and a second confidence function 38, also shown in dashed lines, of the comparison unit 30 to calculate a second confidence value 48 indicating how well the metric algorithms 22, 24, 26, 28 of the first data set 12, 14, 16, 18 reflects properties of the single data value 12' based on the metric values 1222, 1224, 1226, 1228, 12'22, 12'24, 12'26, 12'28 of the first data set 12 and the single data value 12'. The first and second similarity value 42, 46 and the first and second confidence value 44, 48 are part of a comparison result 40 generated by the comparison unit 30. In other words, the similarity is a function of two data sets 12, 14 or one data set 12 and a single data value 12'. Specifically, the similarity is one of a function of two sets of metric values each determined for one corresponding data set or a function of two sets of metric values, one set determined for a data set and one set determined for a single data value. The whole data set is typically not available anymore at the time the similarity is computed, but only the metric values are. The confidence is a function of the metric algorithm itself to indicate how significant the metric algorithm is for the data set on which it was computed. When comparing two data sets, the confidence is only a function of the metric values of the first data set and is therefore "precomputed". So once the metric values are precomputed, the confidence is known. In the case of the comparison of a single data value with a data set, the confidence is a function of the metric values of the data set and the metric values of the single data value. Then the confidence is not precomputed anymore, but may differ for each tested single data value.

The characteristics 20.1, 20.2 or fingerprints are logical containers for one or multiple metric values. Technically, fingerprints are computed by passing all the data values of the data sets 12, 14 successively through all metric algorithms composing the corresponding fingerprint. Each characteristic 20.1, 20.2 uses its own metric algorithms 22, 24, 26, 28 to compute the metric results. Once all data values have been analyzed by all metric algorithms 22, 24, 26, 28, all metric results are serialized in one entity which represents the serialized form of the fingerprint and can be stored in a metadata repository or attached to the metadata of the analyzed data sets 12, 14. Any serialization format can be used. In a preferred embodiment an XML format may be used, but the format itself is not important for the present invention.

Figure 3:
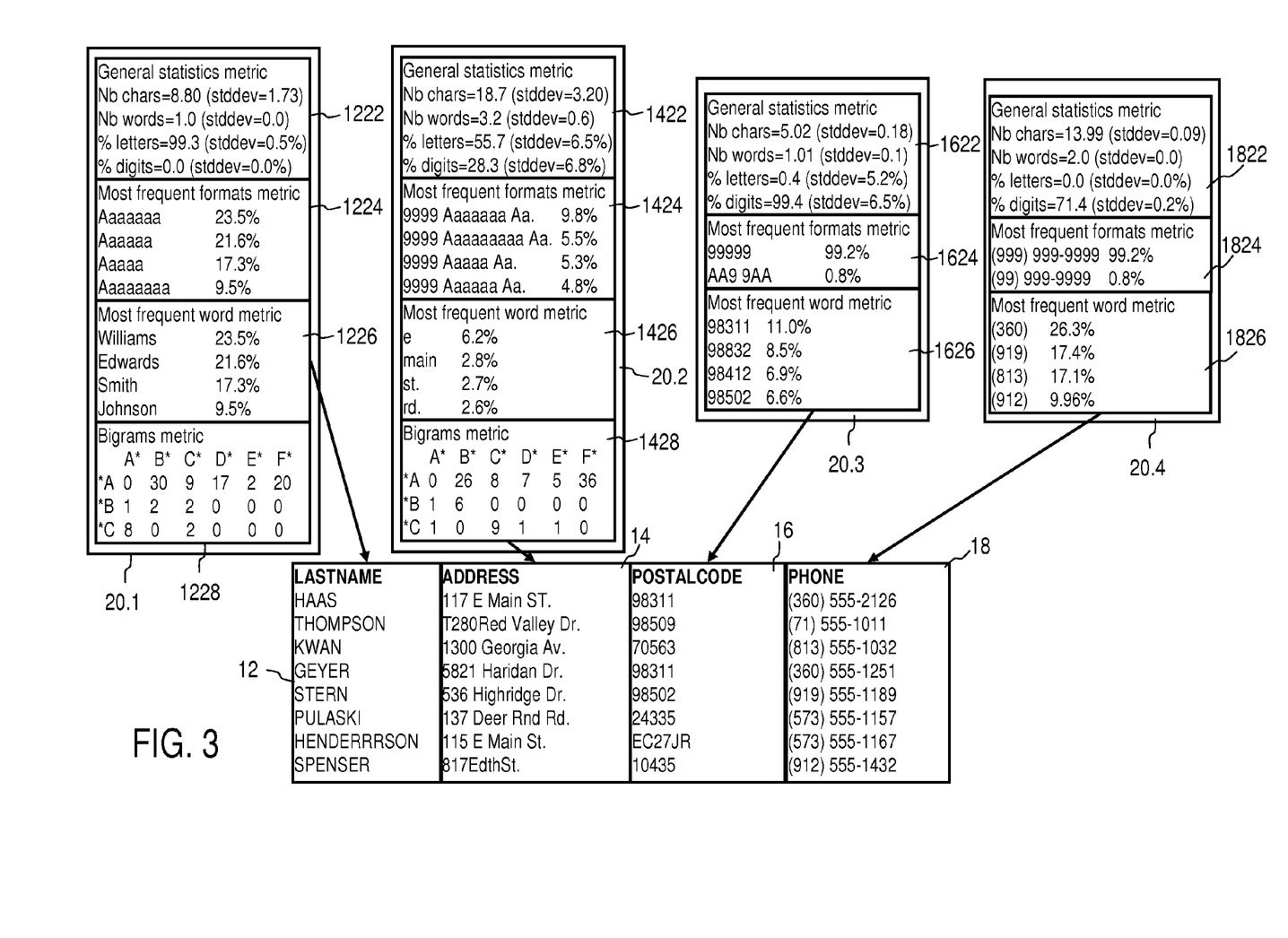
FIG. 3 is a block diagram showing characteristics attached to metadata of different data sets, in accordance with an embodiment of the present invention.
Figure 4:
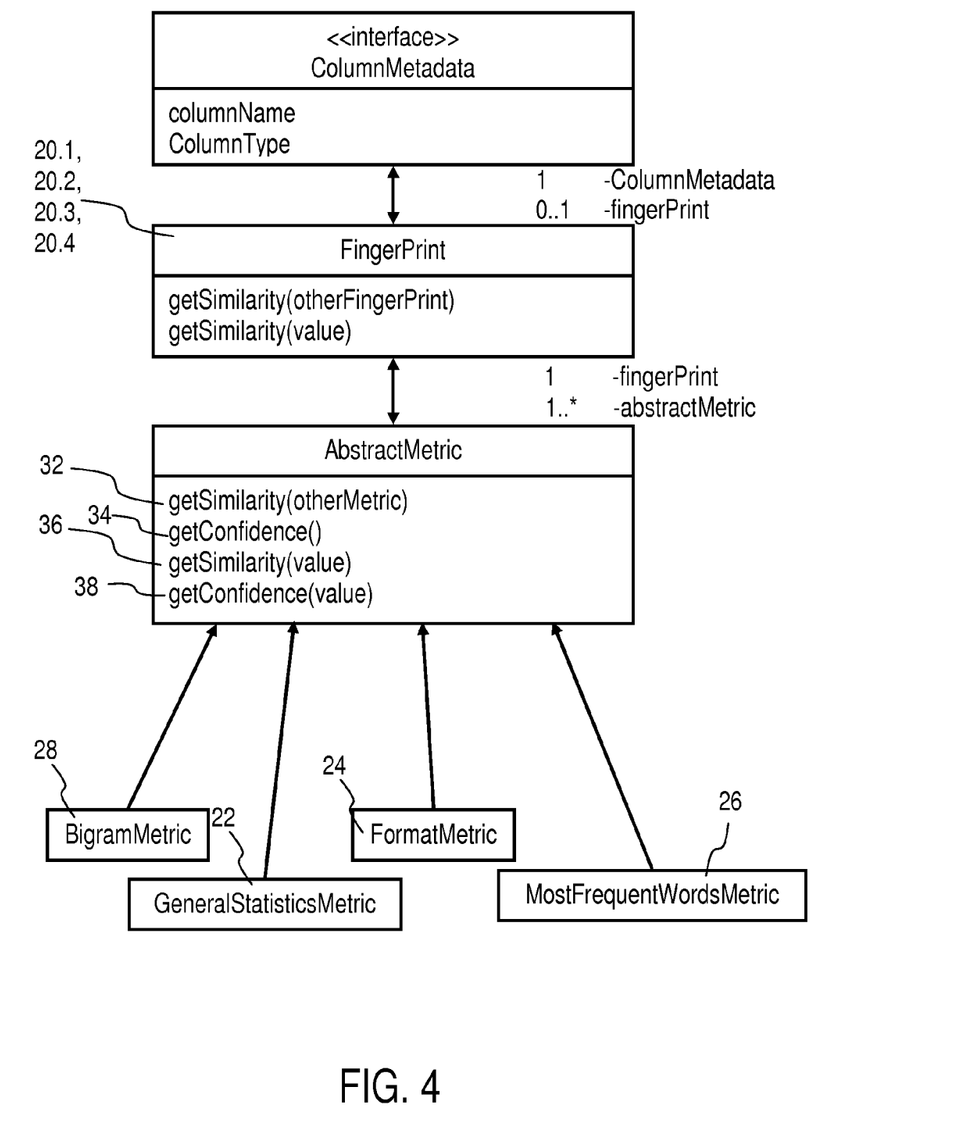
FIG. 4 is a UML model to implement fingerprints as characteristics used by embodiments of the present invention.

FIG. 3 shows fingerprints 20.1, 20.2, 20.3, 20.4 attached to metadata of different data sets 12, 14, 16, 18, each representing a column LASTNAME, ADDRESS, POSTALCODE or PHONE in a table, and FIG. 4 shows a UML (Unified Modeling Language) model to implement fingerprints as characteristics used by embodiments of the present invention.

Referring to FIGS. 3 and 4, for each data set 12, 14, 16, 18 a fingerprint 20.1, 20.2, 20.3, 20.4 which is made up of several metric values 1222, 1224, 1226, 1228, 1422, 1424, 1426, 1428, 1622, 1624, 1626, 1822, 1824, 1826 had been computed for each data set 12, 14, 16, 18 and attached to the corresponding metadata. The association of the fingerprint 20.1, 20.2, 20.3, 20.4 to the data set 12, 14, 16, 18 can be done either by extending the metadata model to support the concept of fingerprints 20.1, 20.2, 20.3, 20.4, or by utilizing a generic annotation mechanism that the metadata model may offer, or simply use a table associating the data set names with the serialized fingerprints 20.1, 20.2, 20.3, 20.4.

FIG. 3 shows that the fingerprint 20.1, 20.2, 20.3, 20.4 of different data sets 12, 14, 16, 18 may contain different metrics types. For example, the fingerprints 20.1, 20.2 of the columns LASTNAME and ADDRESS contain a "bigram metric algorithm" 28 which measures the frequency of occurrence of different bigrams of letters. The bigram metric can only be computed on values containing letters and forming words, which is not the case for the columns "POSTALCODE" and "PHONE". For that reason, the bigram metric hasn't been computed for the columns POSTALCODE and PHONE. The bigram metric algorithm 28 calculates metric values 1228 and 1428. The metric algorithms 22, 24, 26, 28 calculating metric values 1222, 1224, 1226, 1228, 1422, 1424, 1426, 1428, 1622, 1624, 1626, 1822, 1824, 1826 for characteristics 20.1, 20.2, 20.3, 20.4 don't have to be the same for all data sets 12, 14, 16, 18. All shown fingerprints 20.1, 20.2, 20.3, 20.4 of the columns LASTNAME, ADDRESS, POSTALCODE and PHONE contain metric values 1222, 1422, 1622, 1822 calculated by a "general statistics metric algorithm" 22, metric values 1224, 1424, 1624, 1824 calculated by a "most frequent formats metric algorithm" 24, metric values 1226, 1426, 1626, 1826 calculated by a "most frequent words metric algorithm" 26. When two data sets 12, 14, 16, 18 are compared with each other, only the pairs of metric values 1222, 1224, 1226, 1228, 1422, 1424, 1426, 1428, 1622, 1624, 1626, 1822, 1824, 1826 of same type will be compared, and metric values 1222, 1224, 1226, 1228, 1422, 1424, 1426, 1428, 1622, 1624, 1626, 1822, 1824, 1826 which are present in one fingerprint 20.1, 20.2, 20.3, 20.4 but not in the other will be ignored. Two fingerprints 20.1, 20.2, 20.3, 20.4 must have at least one metric value 1222, 1224, 1226, 1228, 1422, 1424, 1426, 1428, 1622, 1624, 1626, 1822, 1824, 1826 of same type in common to be comparable with each other. In the shown embodiment when comparing the first data set 12 with the second data set 14 the metric values 1222, 1224, 1226, 1228, 1422, 1424, 1426, 1428 calculated by the general statistics metric algorithm 22, the most frequent formats metric algorithm 24, the most frequent words metric algorithm" 26 and the bigram metric algorithm 28 are used. When comparing the third data set 16 with the fourth data set 18, the metric values 1622, 1624, 1626, 1822, 1824, 1826 calculated by the general statistics metric algorithm 22, the most frequent formats metric algorithm 24, and the most frequent words metric algorithm 26 are used. When comparing the first or second data set 112, 14 with the third data set 16 or fourth data set 18 the metric values 1222, 1224, 1226, 1422, 1424, 1426, 1622, 1624, 1626, 1822, 1824, 1826 calculated by the general statistics metric algorithm 22, the most frequent formats metric algorithm 24, and the most frequent words metric algorithm" 26 are used, wherein the metric values 1228, 1428 calculated by the bigram metric algorithm 28 are ignored.

Still referring to FIGS. 3 and 4, the fingerprint concept can be implemented by using a fingerprint as class defining two methods to compute the similarity scores between two fingerprints 20.1, 20.2, 20.3, 20.4 of two different data sets 12, 14, 16, 18 or between one fingerprint 20.1, 20.2, 20.3, 20.4 and a single data value 12'.

A fingerprint 20.1, 20.2, 20.3, 20.4 contains one or multiple metrics, represented by an abstract metric class. Each metric specialized by a subclass of the abstract metric class provides four functions. The first similarity function 32 is returning a similarity score 42 between a metric value 1222, 1224, 1226, 1228, 1422, 1424, 1426, 1428, 1622, 1624, 1626, 1822, 1824, 1826 and another metric value 1222, 1224, 1226, 1228, 1422, 1424, 1426, 1428, 1622, 1624, 1626, 1822, 1824, 1826 of same type from another fingerprint 20.1, 20.2, 20.3, 20.4. The first confidence function 34 is returning a confidence value 44 of the metric for the data set 12, 14, 16, 18 it has been computed for. The confidence value 44 is a value between 0.0 and 1.0 indicating how good the similarity score 42 returned by this metric can be trusted for the type of data contained in the data set 12, 14, 16, 18 owning the fingerprint 20.1, 20.2, 20.3, 20.4. The second similarity function 36 is returning a similarity score 46 indicating how good a single value fits in the metric computed for the whole data set 12, 14, 16, 18. The second confidence function 38 is returning the confidence value 48 of the result returned by the second similarity function 36.

The similarity and confidence functions 32, 34, 36, 38 are generally not symmetrical. That means that computing similarity between two data sets 12, 14 by using the metric values of the first data set 12 as reference will return a slightly different value as computing similarity between the two data sets 12, 14 by using the metric values of the second data set 14 as reference. The same is true for the confidence functions 34,

38. Normally, even if the results differ when switching the reference and compared metric, this difference is small enough that it doesn't matter which one is used as a reference. As an alternative, it could be safer but longer to compute the similarity between two data sets 12, 14 with reference to the first data set 12 and then the similarity between the two data sets 12, 14 with reference to the second data set 14 and then determine and return an average value of the two results. In the described embodiments the first confidence value 44 relates to the first data set 12 as reference data set only, since the confidence used when comparing two data sets is only a function of the reference data set. Alternatively a more complex algorithm for computing the confidence dynamically based on the metric values of both data sets 12, 14 may be used. But during tests, it appeared that considering only the reference data set to compute the confidence gave results that were good enough, so that a more complex algorithm was not justified.

Furthermore, when two data sets 12, 14 are compared just one data set may be arbitrarily chosen as being the reference data set, here called first data set/metric, and the other one as being the compared data set, here called a second data set/metric. The weights are the confidence values of the reference data set. A more precise computation would be to compute the result first with the first data set being the reference and compute the same again with the second data set being the reference and return the final result as being an average of both.

Equations (1) and (2) show exemplary formulas used to compute the similarity scores between two fingerprints 20.1, 20.2, 20.3, 20.4 or between a fingerprint 20.1, 20.2, 20.3, 20.4 and a single data value, based on the results of the metric algorithms 22, 24, 26, 28.

$$Similarity_1 = \frac{\sum_{i=1}^{n} Confidence(Metric_{i,col1}) * Similarity(Metric_{i,col1}, Metric_{i,col2})}{\sum_{i=1}^{n} Confidence(Metric_{i,col1})} \quad (1)$$

$$Similarity_2 = \frac{\sum_{i=1}^{n} Confidence(Metric_{i,col1}(value)) * Similarity(Metric_{i,col1}, value)}{\sum_{i=1}^{n} Confidence(Metric_{i,col1}(value))} \quad (2)$$

The similarity between two fingerprints 20.1, 20.2, 20.3, 20.4 is computed as being a weighted average of the results of the first similarity function 32 or the second similarity function 36 of the metrics they have in common. The weight used for each metric is its confidence value calculated by the corresponding confidence functions 34, 38. In Equation (1) Similarity$_1$ represents the similarity of the fingerprint of a second data set when compared to the fingerprint of a first or reference data set, Confidence (Metric$_{i,dataset1}$) the computed is confidence of the metric i for a data set 1.

Similarity (Metric$_{i,col1}$, Metric$_{i,col2}$) represents the similarity between the metric i for the data set 1 and the same metric i for a data set 2. The iteration in Equation (1) is done for all pairs of metrics which exist in both fingerprints.

The similarity between the fingerprint of one data set and a data value is computed in a similar way, but by applying the second similarity function 36 and the second confidence function 38 of the metrics.

In the following four different metrics algorithms 22, 24, 26, 28 will be explained used in the preferred embodiment of the present invention.

The idea of the bigram metric algorithm 28 is based on the fact that in data containing human readable values the frequency of the combinations of letters are not equally distributed, wherein values are composed of words, names, or anything based on a human language. For example, in the English language the letter E is much more frequently used in texts as the letter Z. By looking at bigrams, which represent a combination of two letters, some combinations are quite frequent, for example, a letter "Q" is in English most of the time followed by a letter "U", some others are improbable, for example a letter "Q" followed by another letter "Q". This table of frequencies for all possible bigrams is representative for the domain represented by the corresponding data set 12, 14. A data set 12, 14 containing free text values based on the English language, for instance addresses, person names, company names, etc. will have a bigrams table which is characteristic for the English language. A data set containing values in the German language will have a slightly different bigrams table. A data set containing codes which are not based on a natural language will have a completely different table. To calculate such a bigram table all characters of a corresponding text value are converted in upper case. Special characters like "@, -, *" and numbers are removed, wherein blanks are not ignored. Then a sliding window of two character lengths is moved over the remaining string, a matrix of all possible bigrams is generated and the frequency for each appearing bigram is counted. When all content is processed the probability of occurrence for each bigram is calculated.

In FIG. 3, metric values 1228 and 1428 each show a part of such a generated bigram for the columns LASTNAME and ADDRESS. The matrix should be read as follow: The cell in the first row and first column shows that the probability for the bigram AA to appear is 0%. The cell in the second column of the first row shows the probability for the bigram AB. The cell in the first column of the second row, show the probability of the bigram BA and so on.

Equation (3) shows an exemplary formula used to compute the similarity score between data sets 12, 14 based on the results of the bigram metric algorithm 28.

$$Similarity(Metric_{col1}, Metric_{col2}) = \max\left(0, \frac{cov(Metric_{col1}, Metric_{col2})}{\sigma_{Metric_{col1}} * \sigma_{Metric_{col2}}}\right) \quad (3)$$

To compute the similarity between two bigram metrics of two different data sets 12, 14 the bigram tables 1228, 1428 for the two data sets 12, 14 are loaded. Then all values of the matrices are taken as a long sequence of numbers, one sequence of frequencies for each matrix. Next the correlation between those two series of frequencies is calculated. If the correlation is positive, it is returned as being the similarity score. If it is negative, the similarity score is considered to be 0. The more similar the matrices are the closer to 100% the correlation and therefore the similarity score will be.

Equation (4) shows an exemplary formula used to compute the confidence of the bigram metric algorithm 28. The bigram metric algorithm 28 is representative for values containing free text and less representative for bigrams patterns, and useless for values that would be randomly distributed. In the preferred embodiment the percentage of cells in the matrix having a frequency above 0 is calculated as a confidence. That way the bigram metric algorithm 28 has a strong confidence for free text columns where all bigrams are represented and a lower confidence for columns where the number and diversity of values was not high enough to populate the whole matrix.

$$\text{Confidence}(Metric_{col1}) = \frac{1}{N} \sum_{row=1, col=1}^{N} f(Metric_{col1}(row, col)) \quad (4)$$

Where $f(Metric_{col1}(row, col))=0$, if $Metric_{col1}(row, col)=0$ or $f(Metric_{col1}(row, col))=1$, if $Metric_{col1}(row, col)>0$.

To compute the similarity between a bigram metric and one single data value the bigram matrix must be normalized so that the maximum frequency in each column is normalized to 100%. Equation (5) shows the formula for the normalization. Each cell in the matrix is divided by the maximum frequency found in the same column.

$$NormalizedMatrix(row, col) = \frac{Matrix(row, col)}{\max(Matrix(col))} \quad (5)$$

Then all bigrams from the single data value to compare are extracted and the value for each of these bigrams is looked up in the normalized matrix. According to equation (6) an average is computed for all bigrams found in the single data value.

$$score(value) = \frac{\sum_{i=1}^{N} NormalizedMatrix(row(bigram_i), col(bigram_i))}{N} \quad (6)$$

Finally the score obtained by using equation (6) has to be transformed so that scores above 0.4 give a similarity close to 1. The transformation function used in the preferred embodiment is shown in equation (7).

$$Similarity(value, Metric) = \frac{\tanh(\pi(4*score(value)-1))+1}{2} \quad (7)$$

Alternatively the same method could be used with monograms or trigrams or n-grams in general.

The most frequent words metric algorithm 26 computes the list of the most frequently recurring words found in all data values of the analyzed data set 12, 14, 16, 18. It is a quite effective metric to detect similarities in data sets 12, 14, 16, 18 using recurring words. For example data sets 12, 14, 16, 18 containing post addresses are likely to have recurring words like "Street", "Avenue", "city names", etc. Data sets 12, 14, 16, 18 containing person name are likely to have recurring first and last names.

Figure 5:
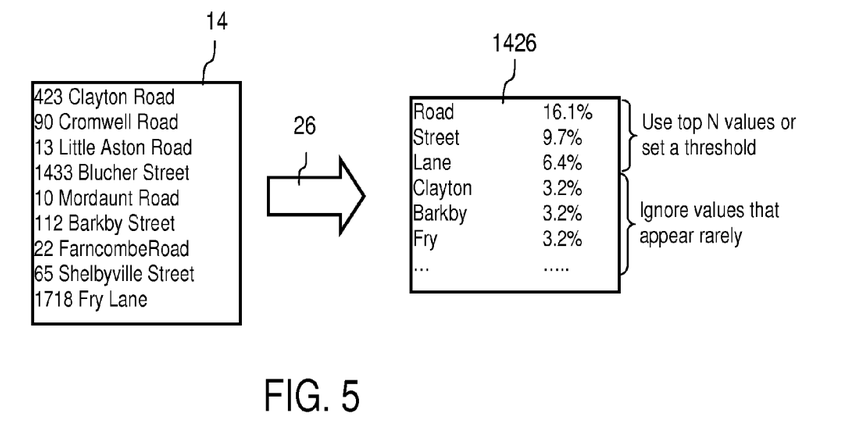
FIG. 5 is a block diagram showing a most frequent words algorithm used as metric algorithm by embodiments of the present invention to calculate characteristics of data sets.

FIG. 5 shows the algorithm 26 to compute the most frequent words. The frequency of each word found in a data set 12, 14, 16, 18 is computed. Finally only the top N values are kept for the analysis, wherein values appearing rarely are ignored. Breadth of distribution is a good indicator for how good the metric 26 will work and is therefore used to calculate the confidence.

Equations (8) and (9) show the formulas used to compute the similarity and confidence for this most frequent words metric algorithm 26 in the preferred embodiment.

$$dist = \sqrt{\sum_{i=1}^{N}(freq_{col1}(word_{col1,i})-freq_{col2}(word_{col1,i}))^2 + \left(\sum_{i=1}^{N}freq_{col1}(word_{col1,i})-\sum_{i=1}^{N}freq_{col2}(word_{col1,i})\right)^2} \quad (8)$$

$$Similarity(Metric_{col1}, Metric_{col2}) = \frac{c}{dist+c} \quad (9)$$

Where c is a constant, for instance $$c = \frac{\sqrt{N+1}}{3}.$$

To compute the similarity between the results of two most frequent words metrics 26, a Euclidean distance between the frequencies of the top N words in the first metric with the frequencies of the same words in the second metric is calculated. Additionally, the frequencies of all other words, i.e., words not belonging to the top N list, are taken as a further dimension. The formula to compute the distance dist is represented by equation (8), for example. Then the distance dist is transferred into a score between 0.0 and 1.0 by using a transformation function as represented by equation (9), for example. The confidence of the metric is the percentage of values in the data set 12, 14, 16, 18 owning the metric, for which at least one word is part of the top N words captured by the metric. Equation (10) shows the formula to compute the confidence for the most frequent words metric 26.

$$Confidence(Metric_{col1}) = \frac{1}{N}\sum_{i=1}^{N} f(value(i)) \quad (10)$$

Where $f(value(i))=0$, if value (i) is not in the list of the top N most frequent words of the metric, or $f(value(i))=1$, if value (i) is in the list of the top N most frequent words of the metric.

The similarity between a single data value and most frequent words metric is computed a bit differently. In the preferred embodiment, a binary similarity is either 0.0 if no word of the single data value is in the top N most frequent words of the metric, and 1.0 if at least one word is in the list. The confidence is computed by summing the frequencies in the top N words metric of all the words composing the single data value.

Figure 6:
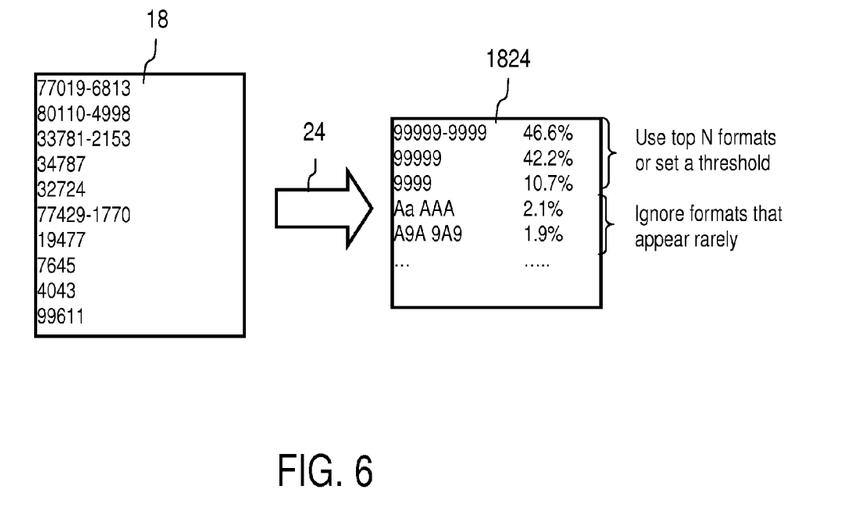
FIG. 6 is a block diagram showing a most frequent formats algorithm used as metric algorithm by embodiments of the present invention to calculate characteristics of data sets.

FIG. 6 shows the algorithm 24 to compute the most frequent formats. The most frequent formats metric algorithm 24 is similar to the most frequent words metric algorithm 26, but instead of capturing recurring words, it captures recurring formats. Each data value in the analyzed data set 12, 14, 16, 18 is transformed into a format mask, where for example all upper case letters are transformed into "A", all lower case letters into "a", all digits into "9" and all other characters remain unchanged. For example, the format mask for "77019-6813" would be "99999-9999". The format mask for "ABC123" would be "AAA999".

Once the values are transformed into their format mask, a similar technique as for the most frequent words metric 26 is used to compute the top N most frequent formats. Like for the most frequent words metric 26, the similarity between two most frequent formats metrics 24 is computed by using a Euclidean distance represented by equation (11) and using a transformation function represented by equation (12).

$$dist = \sqrt{\sum_{i=1}^{N}(freq_{col1}(format_{col1,i}) - freq_{col2}(format_{col1,i}))^2 + \left(\sum_{i=1}^{N} freq_{col1}(format_{col1,i}) - \sum_{i=1}^{N} freq_{col2}(format_{col1,i})\right)^2} \quad (11)$$

$$\text{Similarity}(Metric_{col1}, Metric_{col2}) = \frac{c}{dist+c} \quad (12)$$

Where c is a constant, for instance $$c = \frac{\sqrt{N+1}}{3}.$$

The confidence of the metric is the sum of the frequencies of all formats captured by the most frequent formats metric 24. Equation (13) shows the formula to compute the confidence for the most frequent formats metric 24.

$$\text{Confidence}(Metric_{col1}) = \sum_{i=1}^{N} freq_{col1}(format_{col1,i}) \quad (13)$$

The similarity of a single data value with the most frequent formats metric 24 is here again binary. So the binary similarity is either 0.0 if the format of the single data value is in the top N most frequent formats of the metric 24, and 1.0 if the format is in the list. The confidence is simply the frequency of the format of the single data value in the metric.

The general statistics metric algorithm 22 is about collecting statistics about the data values contained in the analyzed data set 12, 14, 16, 18. The statistics which are collected in the preferred embodiment are an average length of the data values and its standard deviation, an average number of words in each data value and its standard deviation, an average percentage of letters in the data value and its standard deviation, and an average percentage of digits in the data value and its standard deviation. The similarity between two general statistics metrics is then the same as comparing two normal distributions for each four statistics listed previously.

Figure 7:
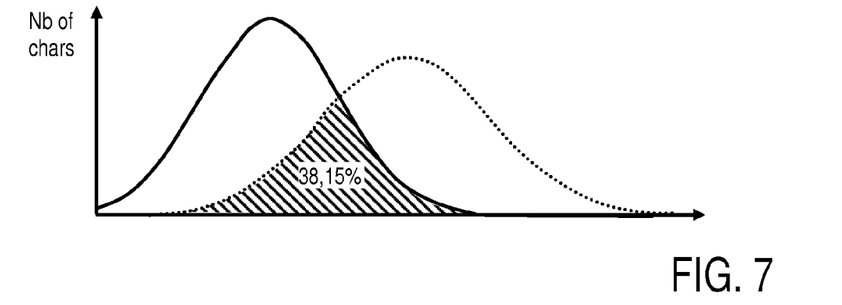
FIG. 7 is a diagram showing two gauss curves each representing a normal distribution for the length of data values in two different data sets.
Figure 8:
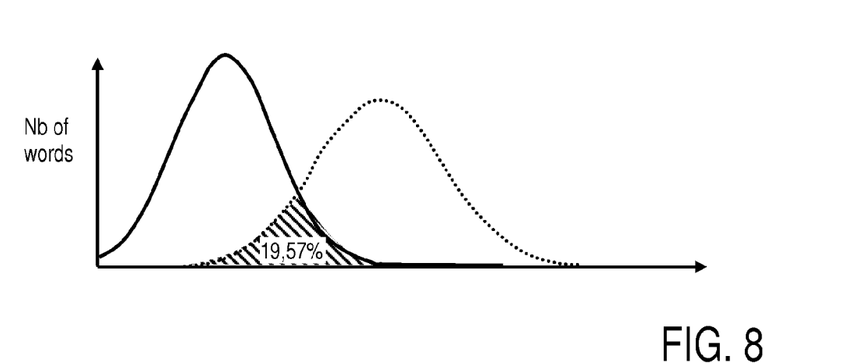
FIG. 8 is a diagram showing two gauss curves each representing a normal distribution for the number of words in data values of two different data sets.
Figure 9:
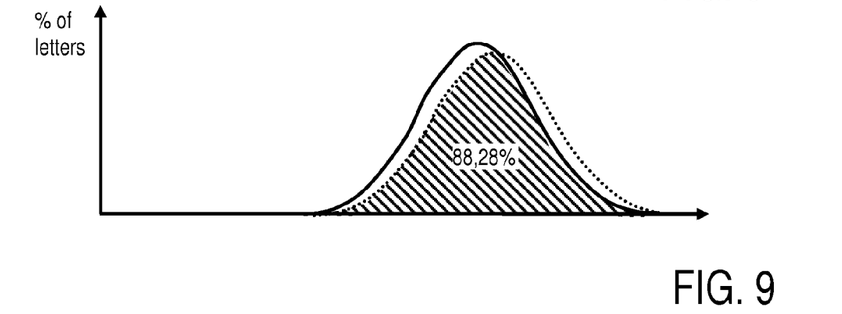
FIG. 9 is a diagram showing two gauss curves each representing a normal distribution for the percentage of letters in data values of two different data sets.
Figure 10:
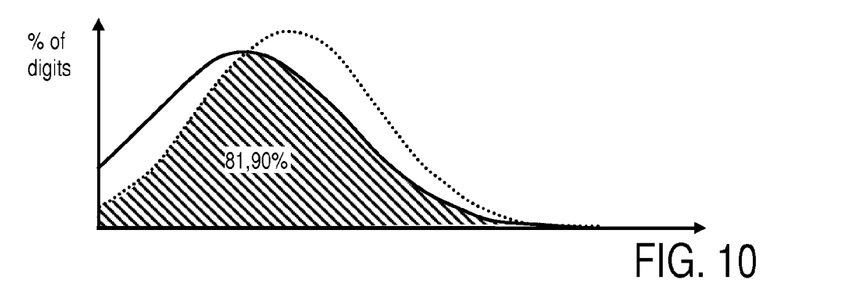
FIG. 10 is a diagram showing two gauss curves each representing a normal distribution for the percentage of digits in data values of two different data sets.

FIG. 7 to FIG. 10 each shows this process graphically. Each general statistics metric 22 can be displayed graphically as four gauss curves representing the normal distributions for the length of the values (number of characters), see FIG. 7, the number of words, see FIG. 8, the percentage of letters, see FIG. 9, and the percentage of digits, see FIG. 10. If the four distributions of another metric from another data set are superposed on the same graph, the similarity for each dimension can be measured by measuring the common area between the two curves, here the solid curve represents a first general statistics metric and the dashed curve represents a second general statistics metric. Referring to FIG. 7, the two compared data sets have a similarity of 38.15% for the number of characters (length of the data values). Referring to FIG. 8, the two compared data sets have a similarity of 19.57% for the number of words. Referring to FIG. 9, the two compared data sets have a similarity of 88.28% for the percentage of letters. Referring to FIG. 10, the two compared data sets have a similarity of 81.90% for the percentage of digits. By computing the average of these similarity scores, we obtain an overall similarity score between the two data sets.

Figure 11:
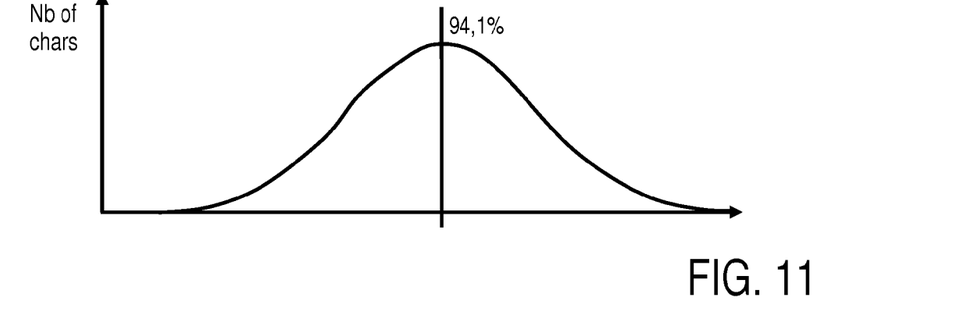
FIG. 11 is a diagram showing a gauss curve representing a normal distribution for the length of data values in a data set and the length of a single data value.
Figure 12:
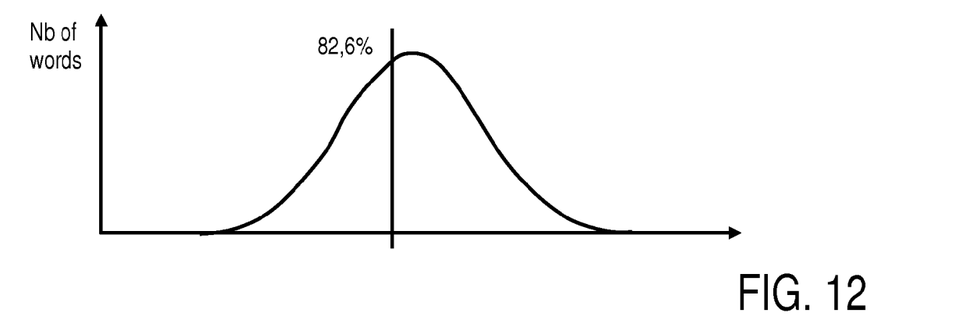
FIG. 12 is a diagram showing a gauss curve representing a normal distribution for the number of words in data values of a data set and the number of words in a single data value.
Figure 13:
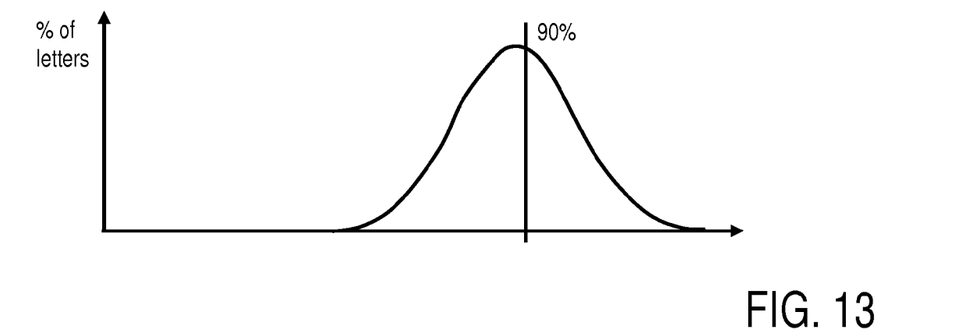
FIG. 13 is a diagram showing a gauss curve representing a normal distribution for the percentage of letters in data values of a data set and the percentage of letters in a single data value.
Figure 14:
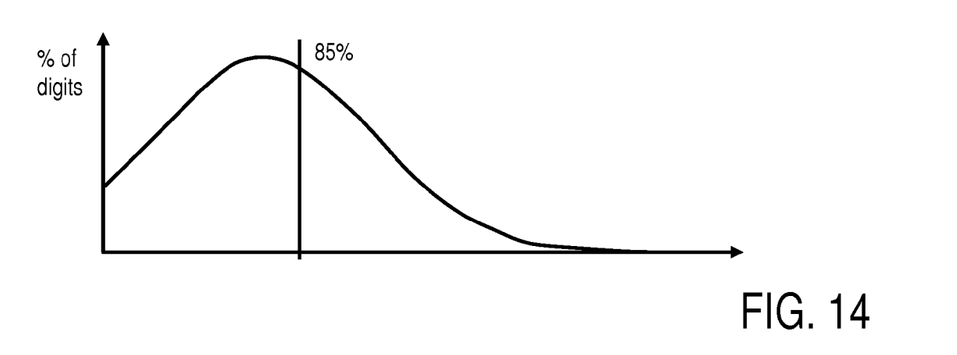
FIG. 14 is a diagram showing a gauss curve representing a normal distribution for the percentage of digits in data values of a data set and the percentage of digits in a single data value.

Computing the similarity between a single data value and the general statistics metric 22 is done the same way. But instead of comparing two normal distributions with each other, a normal distribution is compared with a single data value, as shown in FIGS. 11 to 14. Referring to FIG. 11, the data set and the single data value have a similarity of 94.1% for the number of characters (length of the data values). Referring to FIG. 12, the data set and the single data value have a similarity of 82.6% for the number of words. Referring to FIG. 13, the data set and the single data value have a similarity of 90% for the percentage of letters. Referring to FIG. 14, the data set and the single data value have a similarity of 85% for the percentage of digits. By computing the average of these similarity scores, we obtain an overall similarity score between the data set and the single data value.

The inventive method for handling data sets can be implemented as an entirely software embodiment, or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer implemented method comprising:
    determining a first characteristic for a first data set of a plurality of data elements, wherein the first characteristic includes a first set of metric values indicating properties for the plurality of data elements within the first data set;
    comparing said first data set with at least one of a second data set of a plurality of data elements and a single data value by at least one of the following:
        determining a second characteristic for the second data set, wherein the second characteristic includes a second set of metric values indicating properties for the plurality of data elements within the second data set, and calculating a similarity of said first data set with said second data set based on a comparison of said first and second characteristics; and determining a third characteristic for the single data value, wherein the third characteristic includes a third set of metric values indicating properties for the single data value, and calculating a similarity of said first data set with said single data value based on a comparison of said first characteristic and said third characteristic.

2. The computer implemented method according to claim 1, wherein:

each respective metric value in said first set of metric values is calculated by applying a respective metric algorithm on the first data set, and each metric algorithm includes steps for:

calculating at least one similarity value based on a respective metric value in said first set of metric values and at least one of the following: a value of the same metric algorithm applied to said single data value and a value of the same metric algorithm applied to said second data set, and calculating at least one confidence value based on said respective metric value in said first set of metric values and at least one of the following: a value of the same metric algorithm applied to said single data value and a value of the same metric algorithm applied to said second data set.

3. The computer implemented method according to claim 2, wherein each metric algorithm utilizes at least:

a first similarity function to calculate a first similarity value based on said respective metric value of said first data set and a metric value of the same metric algorithm applied to said second data set, and a first confidence function to calculate a first confidence value indicating how well said metric algorithm reflects properties of said first data set based on said first data set.

4. The computer implemented method according to claim 3, wherein each metric algorithm utilizes at least:

a second similarity function to calculate a second similarity value based on said respective metric value of said first data set and a metric value of the same metric algorithm applied to said single data value, and a second confidence function to calculate a second confidence value indicating how well said metric algorithm reflects properties of said single data value based on said respective metric value of said first data set.

5. The computer implemented method according to claim 4, further comprising:

calculating a weighted average of similarity values provided by said respective metric algorithms for determining at least one of the following: said similarity of said first data set with said second data set, and said similarity of said first data set with said single data value, using at least said first confidence value as a weight for determining similarity of said first data set with said second data set, and using at least said second confidence value as a weight for determining similarity of said first data set with said single data value.

6. The computer implemented method according to claim 5, wherein metric algorithms associated with said first characteristic contain at least one of the following: general statistic metric algorithm, most frequent formats metric algorithm, most frequent words metric algorithm, n-grams metric algorithm, and metric algorithm based on neural networks.

7. The computer implemented method according to claim 6, wherein common metric algorithms and the respective metric values are used for the similarity calculation if said first characteristic associated with said first data set and said second characteristics associated with said second data set contain different metric algorithms.

8. The computer implemented method according to claim 1, further comprising storing said first characteristic in a metadata repository.

9. The computer implemented method according to claim 5, further comprising determining based on said first and second characteristics a domain of at least one of the following: said first data set and said second data set.

10. The computer implemented method according to claim 9, further comprising:

receiving information about the domain of said first data set, and determining whether said second data set belongs to the same domain based on at least one of the following: said determined similarity and said determined confidence.

11. The computer implemented method according to claim 10, further comprising at least one of the following steps:

determining that said single data value is inconsistent with said domain of said first data set based on said second similarity value, if said second similarity value does not fulfill a predefined condition, and determining that said single data value is consistent with said domain of said first data set based on said second similarity value, if said second similarity value fulfills a predefined condition.

12. The computer implemented method according to claim 1, comprising detecting said first data set as a mapping candidate in a data transformation based on said first characteristic.

13. A tangible computer program product comprising a computer readable storage medium having computer readable program code embodied therewith, the computer readable program code configured to:

determine a first characteristic for a first data set of a plurality of data elements, wherein the first characteristic includes a first set of metric values indicating properties for the plurality of data elements within the first data set;

compare said first data set with at least one of a second data set of a plurality of data elements and a single data value by at least one of the following:

determining a second characteristic for the second data set, wherein the second characteristic includes a second set of metric values indicating properties for the plurality of data elements within the second data set, and calculating a similarity of said first data set with said second data set based on a comparison of said first and second characteristics; and determining a third characteristic for the single data value, wherein the third characteristic includes a third set of metric values indicating properties for the single data value, and calculating a similarity of said first data set with said single data value based on a comparison of said first characteristic and said third characteristic.

14. The tangible computer program product according to claim 13, wherein:

each respective metric value in said first set of metric values is calculated by applying a respective metric algorithm on the first data set, and each metric algorithm includes steps configured to:
- calculate at least one similarity value based on a respective metric value in said first set of metric values and at least one of the following: a value of the same metric algorithm applied to said single data value and a value of the same metric algorithm applied to said second data set, and
- calculate at least one confidence value based on said respective metric value in said first set of metric values and at least one of the following: a value of the same metric algorithm applied to said single data value and a value of the same metric algorithm applied to said second data set.

15. The tangible computer program product according to claim 14, wherein each metric algorithm utilizes at least:
- a first similarity function to calculate a first similarity value based on said respective metric value of said first data set and a metric value of the same metric algorithm applied to said second data set, and
- a first confidence function to calculate a first confidence value indicating how well said metric algorithm reflects properties of said first data set based on said first data set.

16. The tangible computer program product according to claim 15, wherein each metric algorithm utilizes at least:
- a second similarity function to calculate a second similarity value based on said respective metric value of said first data set and a metric value of the same metric algorithm applied to said single data value, and
- a second confidence function to calculate a second confidence value indicating how well said metric algorithm reflects properties of said single data value based on said respective metric value of said first data set.

17. The tangible computer program product according to claim 16, wherein the computer readable program code is further configured to:
- calculate a weighted average of similarity values provided by said respective metric algorithms for determining at least one of the following: said similarity of said first data set with said second data set, and said similarity of said first data set with said single data value,
- utilize at least said first confidence value as a weight for determining similarity of said first data set with said second data set, and
- utilize at least said second confidence value as a weight for determining similarity of said first data set with said single data value.

18. A system comprising a computer system including at least one processor configured to:
- determine a first characteristic for a first data set of a plurality of data elements, wherein the first characteristic includes a first set of metric values indicating properties for the plurality of data elements within the first data set;
- compare said first data set with at least one of a second data set of a plurality of data elements and a single data value by at least one of the following:
  - determining a second characteristic for the second data set, wherein the second characteristic includes a second set of metric values indicating properties for the plurality of data elements within the second data set, and calculating a similarity of said first data set with said second data set based on a comparison of said first and second characteristics; and
  - determining a third characteristic for the single data value, wherein the third characteristic includes a third set of metric values indicating properties for the single data value, and calculating a similarity of said first data set with said single data value based on a comparison of said first characteristic and said third characteristic.

19. The system according to claim 18, wherein:
each respective metric value in said first set of metric values includes metric values calculated by applying a respective metric algorithm on the first data set, and
each metric algorithm includes steps configured to:
- calculate at least one similarity value based on a respective metric value in said first set of metric values and at least one of the following: a value of the same metric algorithm applied to said single data value and a value of the same metric algorithm applied to said second data set, and
- calculate at least one confidence value based on said respective metric value in said first set of metric values and at least one of the following: a value of the same metric algorithm applied to said single data value and a value of the same metric algorithm applied to said second data set.

20. The system according to claim 19, wherein each metric algorithm utilizes at least:
- a first similarity function to calculate a first similarity value based on said respective metric value of said first data set and a metric value of the same metric algorithm applied to said second data set, and
- a first confidence function to calculate a first confidence value indicating how well said metric algorithm reflects properties of said first data set based on said first data set.

21. The system according to claim 20, wherein each metric algorithm utilizes at least:
- a second similarity function to calculate a second similarity value based on said respective metric value of said first data set and a metric value of the same metric algorithm applied to said single data value, and
- a second confidence function to calculate a second confidence value indicating how well said metric algorithm reflects properties of said single data value based on said respective metric value of said first data set.

22. The system according to claim 21, wherein the at least one processor is further configured to:
- calculate a weighted average of similarity values provided by said respective metric algorithms for determining at least one of the following: said similarity of said first data set with said second data set, and said similarity of said first data set with said single data value,
- utilize at least said first confidence value as a weight for determining similarity of said first data set with said second data set, and
- utilize at least said second confidence value as a weight for determining similarity of said first data set with said single data value.

* * * * *